Nov. 1, 1960 E. L. SCHEIDENHELM 2,958,176
HARVESTER FOR PUMPKINS AND SIMILAR CROPS
Filed May 4, 1959 6 Sheets-Sheet 1

INVENTOR.
Earl L. Scheidenhelm
BY Stradwell
Atty.

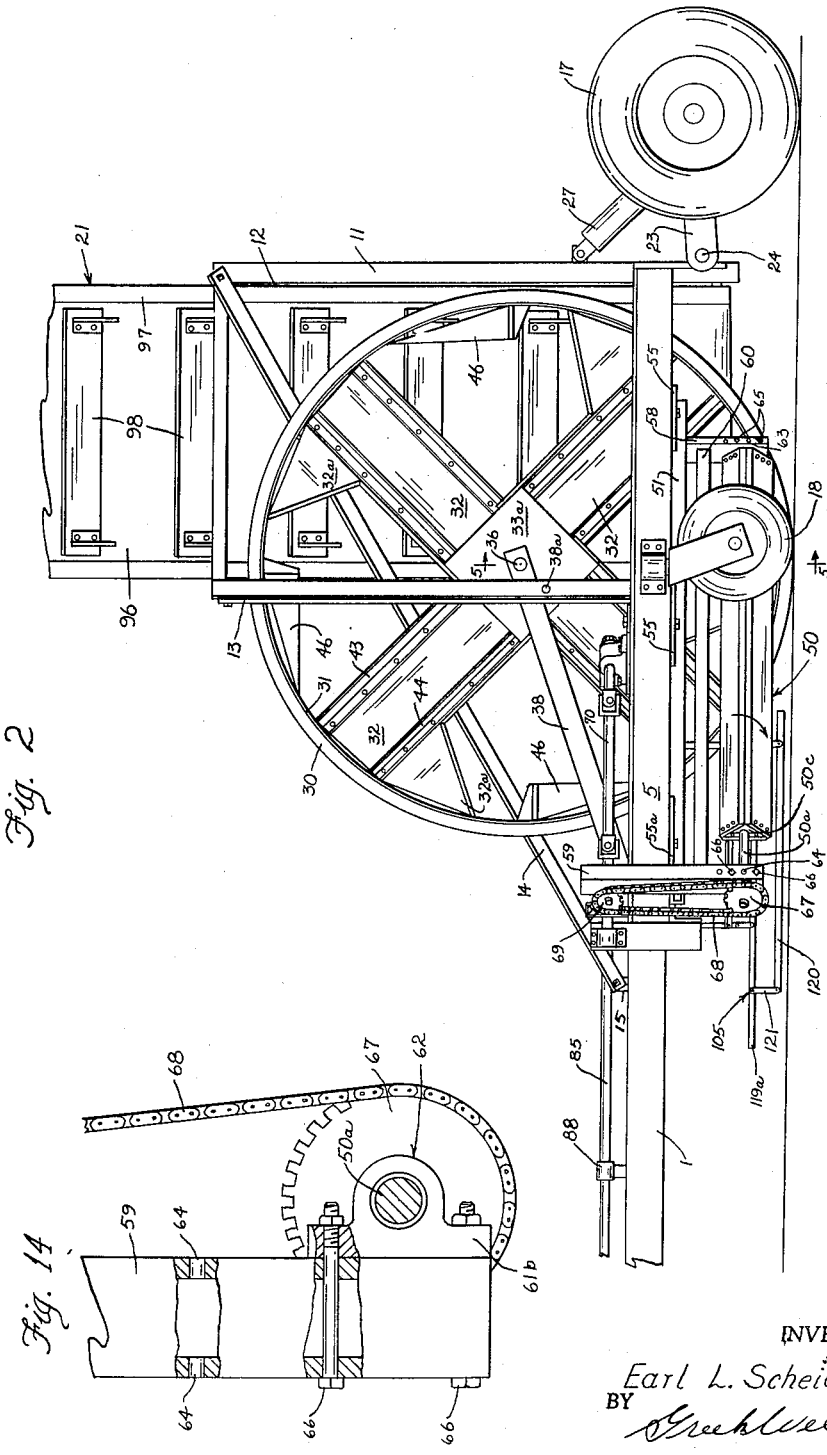

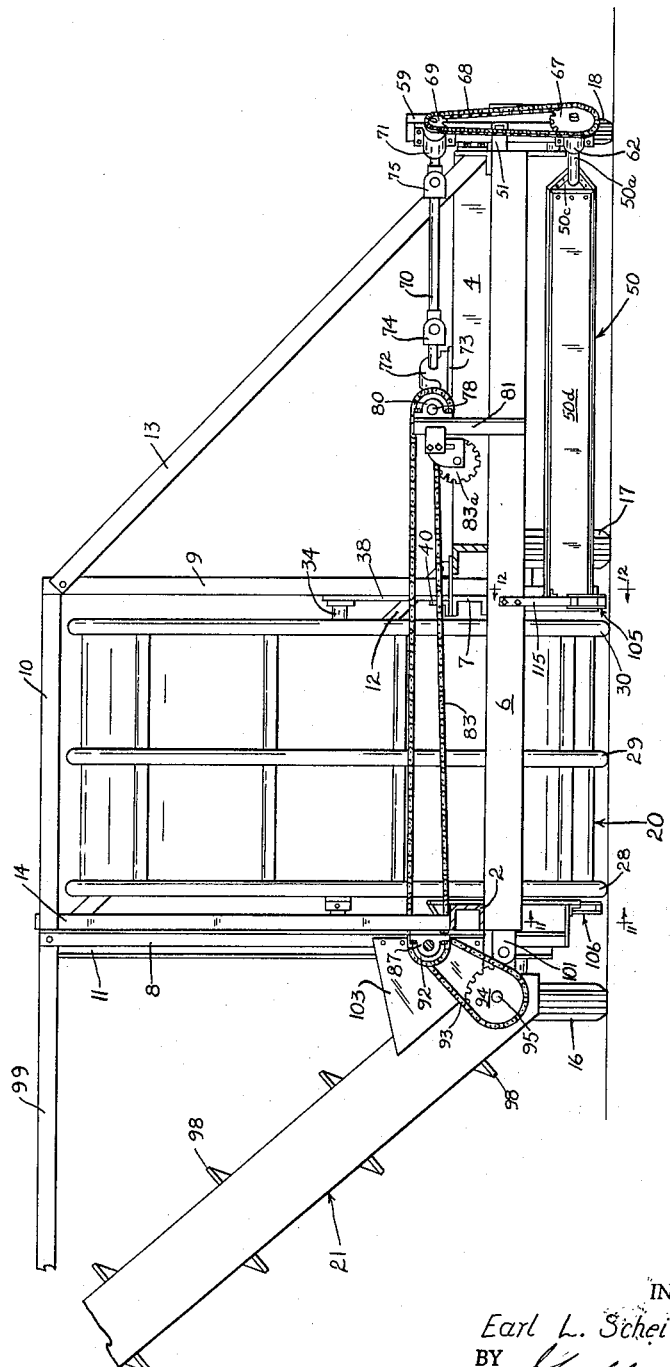

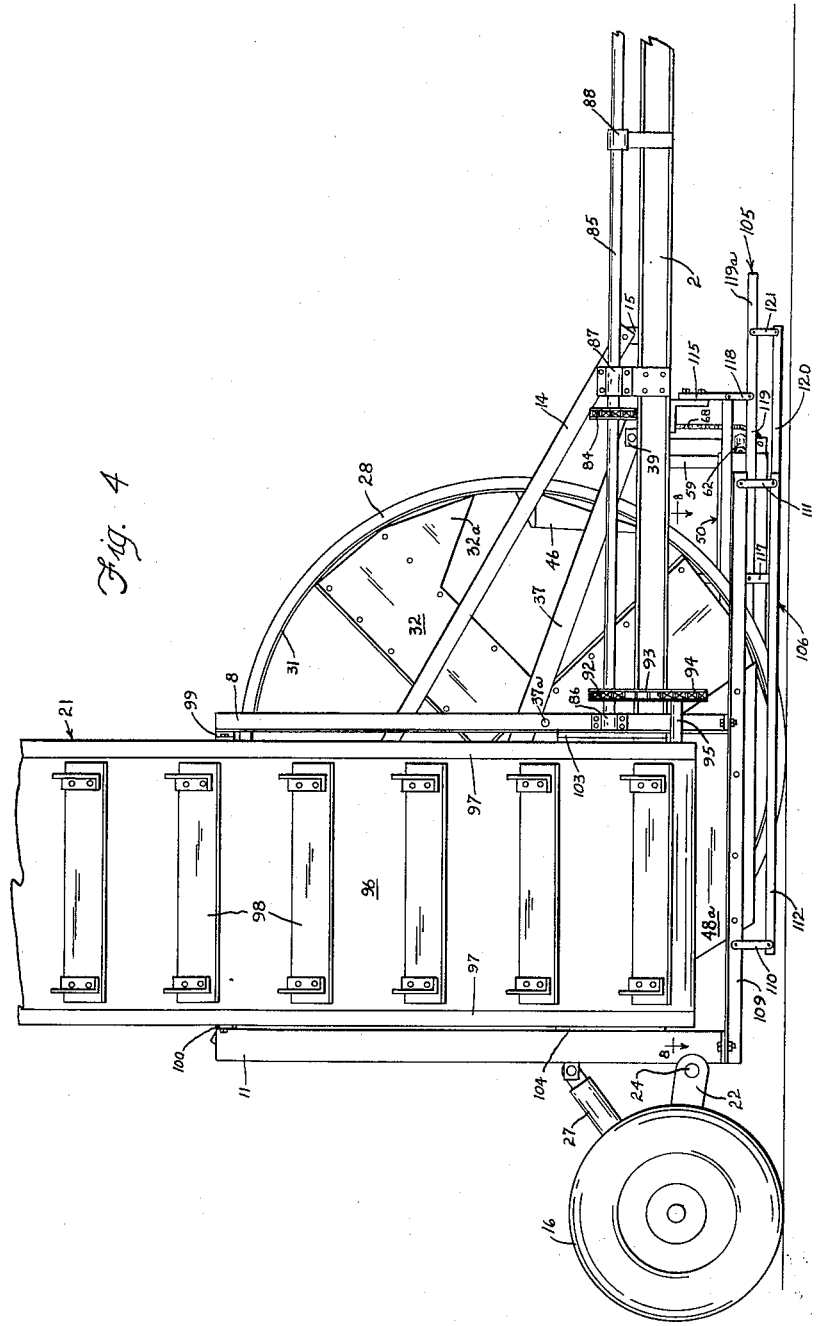

Nov. 1, 1960 E. L. SCHEIDENHELM 2,958,176
HARVESTER FOR PUMPKINS AND SIMILAR CROPS
Filed May 4, 1959 6 Sheets-Sheet 6
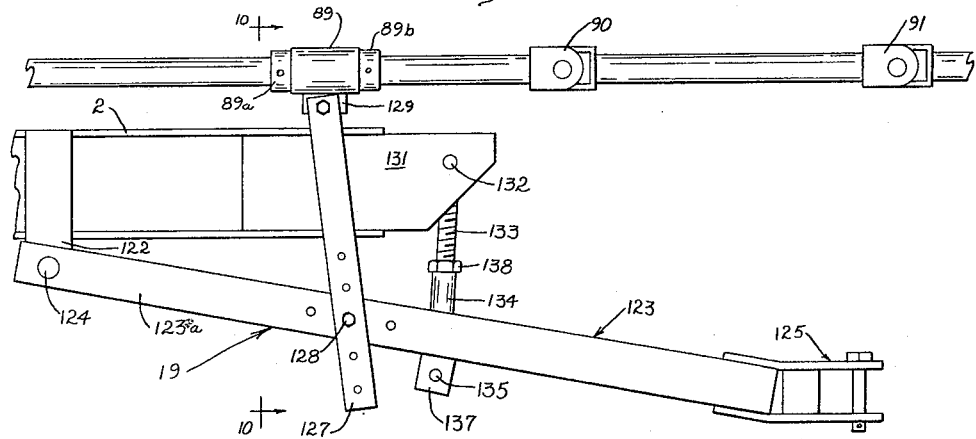
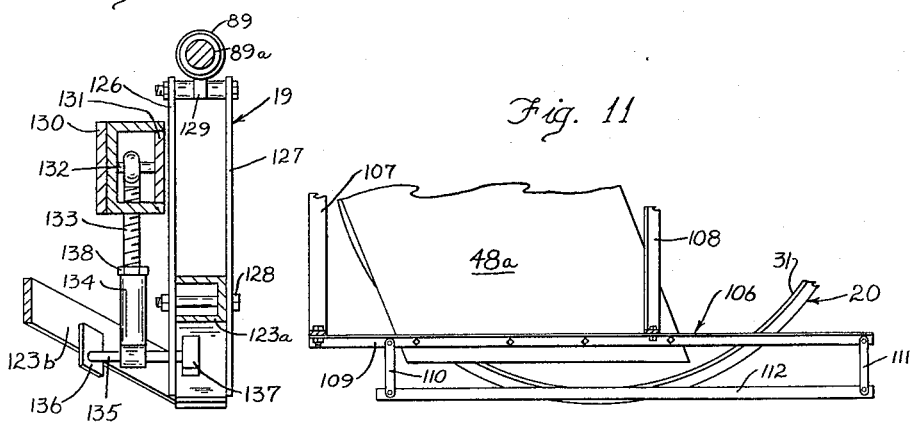
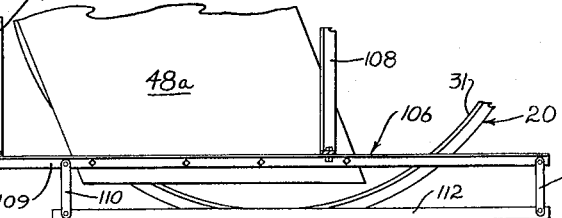
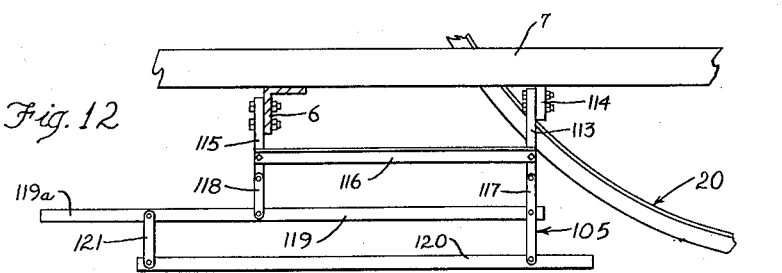
INVENTOR.
Earl L. Scheidenhelm
BY
Atty.

United States Patent Office 2,958,176
Patented Nov. 1, 1960

2,958,176

HARVESTER FOR PUMPKINS AND SIMILAR CROPS

Earl L. Scheidenhelm, Mendota, Ill., assignor to Horace D. Hume, Mendota, Ill.

Filed May 4, 1959, Ser. No. 810,625

3 Claims. (Cl. 56—27)

The present invention relates to a harvester for pumpkins, squash and similar crops. These crops have a relatively easily damaged outer shell and have vines which are difficult to handle. It is the purpose of the present invention to provide a harvester for such crops that embodies a gathering rotor that is power driven and inclined with respect to the direction of travel of the harvester, together with a ground driven drum having inclined vanes therein operable to pick up the pumpkins, etc. that arrive at the rear end of the gathering rotor and transfer them across the drum to an elevated discharge point and discharge them to an elevating conveyor.

It is also a purpose of this invention to provide in combination with the aforesaid rotor and drum, yielding guide means, operable to deflect any of the crop that is directed in front of the drum by the rotor and prevent the crop from being crushed by the drum. It is generally the custom to gather the pumpkins in a windrow by other equipment before picking them up, so the present harvester must pick up the crop after it is already in a window.

More particularly it is the purpose of this invention to provide an improved harvester wherein the pumpkins and similar crops are fed into a drum rolling along the ground by an inclined rotor that is substantially triangular in cross section, and the drum is provided with tapered deflectors on the interior thereof which increase in depth from the rotor facing end of the drum toward the discharge end, and with elevating platforms beginning at a distance from the inlet end of the drum and extending to the discharge end, the elevating platforms extending into and being attached to the drum hub whereby to furnish connection between the periphery of the drum and the drum hub.

Other objects and advantages of my invention will appear from the following description and the accompanying drawings wherein the preferred form of the invention is shown. The drawings and description are, however, intended to be illustrative only and not as limiting the scope of the invention as defined in the claims.

In the drawings:

Figure 2 is a side view with parts broken away of the harvester;

Figure 3 is a sectional view with parts broken away, taken on the line 3—3 of Figure 1;

Figure 4 is a side view with parts broken away, showing the side of the harvester opposite that shown in Figure 2;

Figure 9 is an enlarged fragmentary side view taken looking in the direction indicated at 9—9 in Figure 1, and showing the hitch mechanism for attaching the harvester to a tractor or similar tow vehicle;

Figure 10 is a sectional view taken on the line 10—10 of Figure 9;

Figure 11 is a fragmentary sectional view with parts left out, taken on the line 11—11 of Figure 3;

Figure 12 is a fragmentary sectional view with parts left out, taken on the line 12—12 of Figure 3;

Figure 14 is a fragmentary sectional view taken on the line 14—14 of Figure 1;

Figures 1, 13:
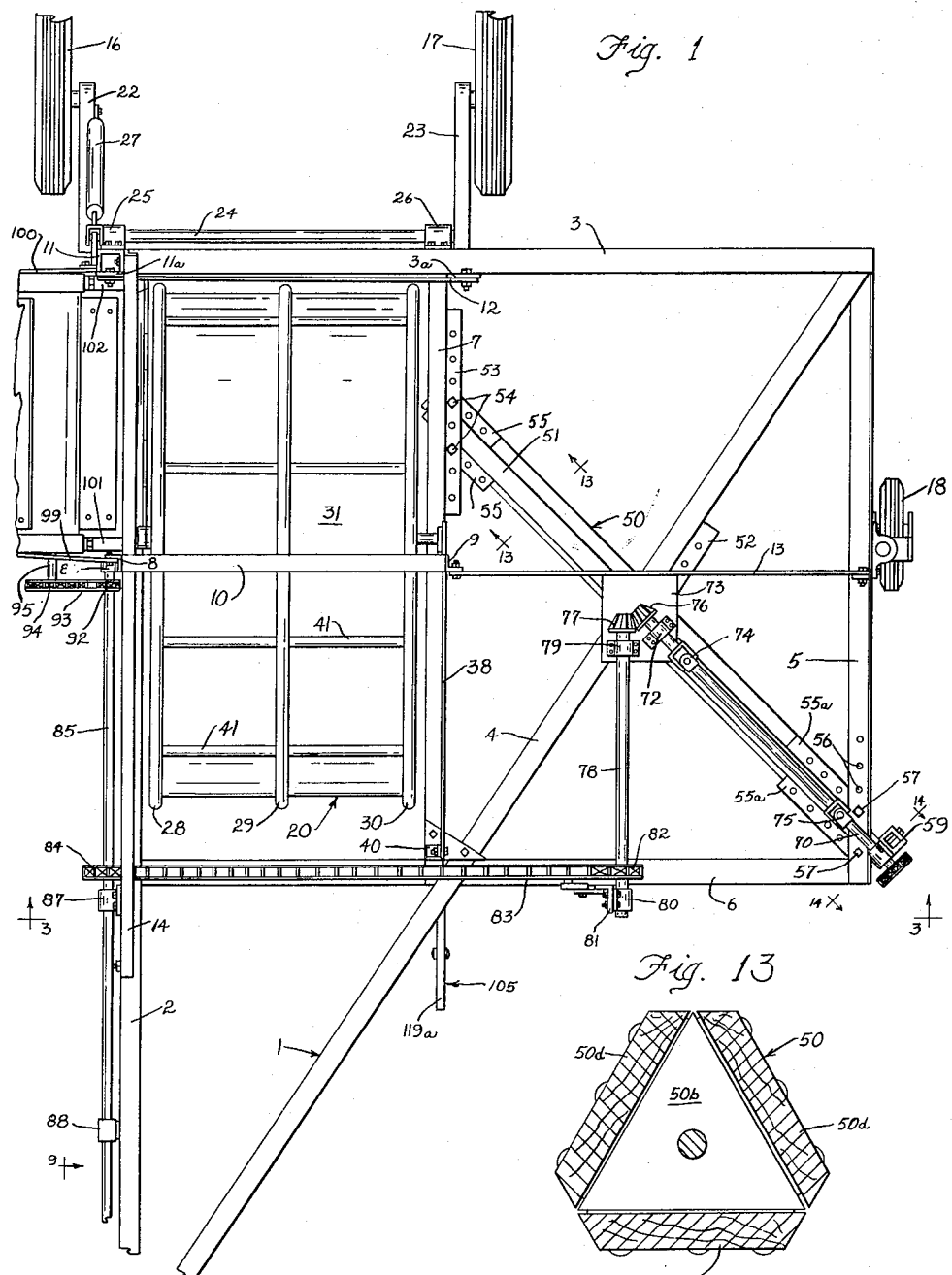
Figure 1 is a plan view with parts broken away, of a harvester for pumpkins and similar crops that embodies my invention.
Figure 13 is an enlarged fragmentary sectional view taken on the line 13—13 of Figure 1.

The general characteristics of my invention are shown best by Figures 1 to 4 inclusive. The harvester constructed in accordance with my invention has a base triangular horizontal frame 1 that includes a longitudinal frame member 2, a rear transverse frame member 3 and a diagonal frame member 4, all rigidly joined together where they meet. From the junction of the members 3 and 4 another frame member 5 extends forwardly parallel to the member 2. A front transverse frame member 6 extends from the member 5 to the member 2 beneath the several members 2, 4 and 5 and is rigidly joined to all three frame members. An intermediate frame member 7 extends from the frame member 3 forwardly parallel to the frame member 2 to the point where the frame members 4 and 6 cross and is rigidly secured to the members 3, 4 and 6.

About midway between the frame members 3 and 6 the members 2 and 7 have uprights 8 and 9 fixed to them. These uprights are joined at the top by a cross bar 10. At the corner where the frame members 2 and 3 are joined, another upright 11 is fixed to the frame member 2 and a brace 12 extends diagonally downward from the top of the upright 11 to the member 3 and is bolted to plates 11a and 3a that are welded to the upright 11 and the member 3 respectively. A brace 13 connects the top of the upright 9 to the frame member 5. Another brace 14 is bolted to the upright 11 and extends from the top of the upright 11 forwardly and downwardly to the frame member 2. The member 2 has a plate 15 welded thereon to which the brace 14 is bolted. The brace 14 is also bolted to the upright 8 where it crosses this upright.

The framework just described is supported by two rear wheels 16 and 17, a side wheel 18, a front hitch 19 that is adapted to be supported by a tractor or other towing vehicle not shown. It guides a drum 20 that has therein the means for elevating the crop to a loading conveyor 21. The wheels 16 and 17 are journalled on arms 22 and 23 which are fixed to a rock shaft 24. The shaft 24 is mounted to the frame member 3 by bearings 25 and 26. A hydraulic jack 27 connected between the upright 11 and the arm 22, serves as a means to raise and lower the wheels 16 and 17 with respect to the frame member 3. Suitable connections (not shown) are provided to supply fluid under pressure to the jack 27. Normally the drum 20 rolls on the ground and the wheels 16 and 17 do not need to support the drum 20. However, for transport to and from the field it is desirable to lift the drum 20 off the ground and the wheels 16 and 17 are lowered by means of the jack 27 to raise the rear end of the machine.

Figure 5:
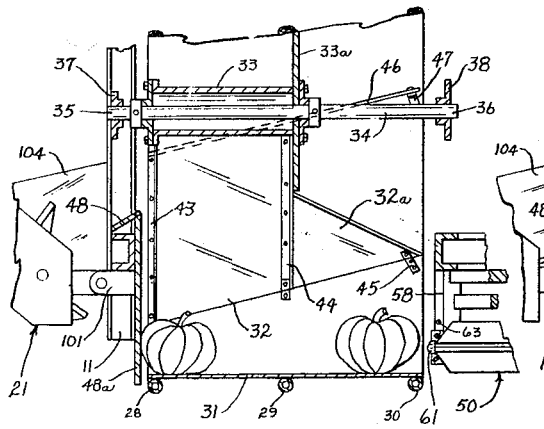
Figures 5, 6 and 7 are fragmentary sectional views taken on the line 5—5 of Figure 2, with parts broken away, showing three different positions of the drum.
Figure 6:
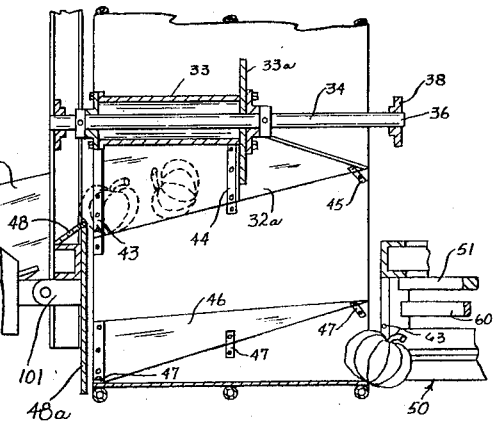
Figure 7:
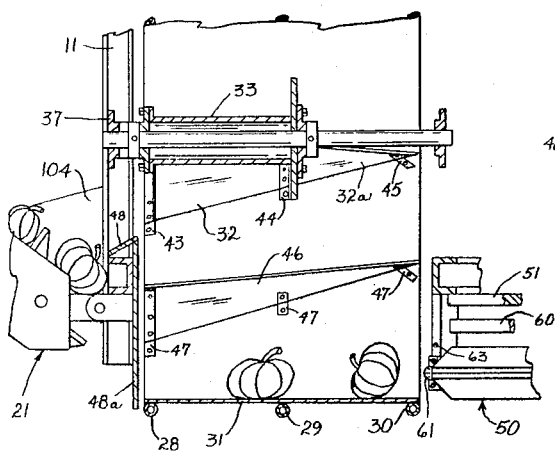
Figure 8:
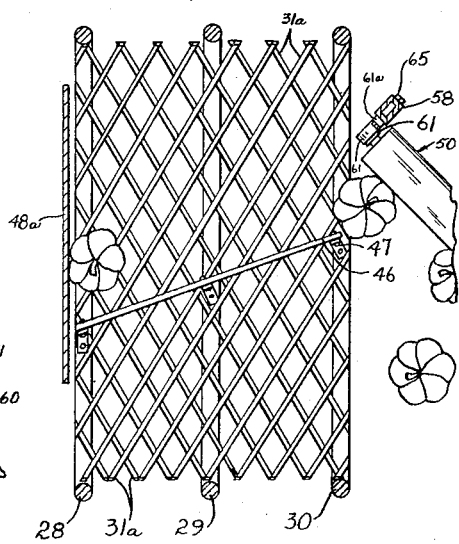
Figure 8 is a fragmentary sectional view with parts left out, taken substantially on the line 8—8 of Figure 4.

The drum 20 has three peripheral rings 28, 29 and 30 adapted to roll on the ground. The rings support a shell 31 which is secured to the several rings. Preferably this shell is of an open mesh construction, as shown in Figure 8 at 31a, although it may be of sheet material as indicated in Figures 5, 6 and 7. Within the shell there are four major vanes 32 which are affixed to the rings 28, 29 and 30, and which extend in to a hub 33 and are affixed to this hub. The hub 33 is carried on an axle 34 that has its ends 35 and 36 mounted in bars 37 and 38. The bars 37 and 38 are supported on the uprights 8 and 9 respectively by stop pins 37a and 38a so they can move up but not down, and extend forwardly and downwardly to brackets 39 and 40 on the frame members 2 and 7 respectively, to which the bars 37 and 38 are pivotally secured. The rings 28, 29 and 30 are connected to each other outside of the shell 31 by cross members 41 to give the drum structure adequate strength. The vanes 32 provide elevating platforms.

The major vanes 32 within the drum extend all the way from the hub 33 to the shell 31 between the rings 28 and 29 and are inclined with respect to the axis of the shell so that the portions of the vanes that are aligned with the ring 29 are ahead of the portions aligned with the ring 28. Each major vane has a reduced tapered extension 32a which starts about midway between the hub end piece 33a and the shell 31 and tapers to a point at the ring 30. Cross bars 43 and 44 extend from the hub 33 to the rings 28 and 29 to support the vanes 32 and a bracket 45 connected to the ring 30 secures the tip of the extension 32a. It will be noted that the hub 33 has an enlarged end 33a to which the forward cross member 44 attaches. Between the major vanes 32 of which there are 4, the drum also carries minor vanes 46 which are also inclined from the ring 28 to the ring 30 with respect to a plane through the axis of the drum 20. These vanes are tapered in height from a maximum about one-fourth the radius of the drum at the ring 28, to a point at the ring 30. Brackets 47 connect the minor vanes 46 to the rings 28, 29 and 30. The members 32a and 46 provide tapered pumpkin deflectors.

The function of the inclined vanes is, as illustrated in Figures 5, 6 and 7, to lift the pumpkins and the like that enter the drum through the ring 30 and roll the lifted crop across the drum to the ring 28 as the drum 20 rolls along the ground. When the vanes have lifted the crop up to a height where the crop will roll along a vane to the ring 28, the crop can then be moved out over a ledge 48 to the elevating conveyor 21 that will lift the crop.

The harvester includes a rotor 50 which is adapted to feed the windrowed pumpkins and the like into the drum 20 through the ring 30. The rotor 50 is suspended from a diagonal bar 51 that extends from the front end of the frame member 5 beneath the frame member 4 to the frame member 7. The frame members 4 and 7 have apertured plates 52 and 53 fixed thereon to receive bolts indicated at 54 that extend downwardly and through flanges 55 that are mounted on the bar 51 to clamp it up against the plates 52 and 53. The frame member 5 is an angle iron and it is apertured as indicated at 56 to receive bolts 57 which pass through flanges 55a on the bar 51 to hold it against the frame member 5. The bar 51 has end pieces 58 and 59 depending therefrom and these end pieces are in turn connected by another bar 60 to provide a framework supporting the rotor 50. The bars 58 and 59 have bearings 61 and 62 for the shaft 50a of the rotor 50. It will be noted from Figure 8 that the bearing 61 is a thrust bearing to take the end thrust of the rotor 50. The bearings 61 and 62 are, as shown in the drawings, adjustable up and down to vary the height of the rotor 50 with respect to the supporting frame. The adjustment is made by providing series of apertures 63 and 64 in the members 58 and 59 and using the bolts 65 and 66 to secure the bearing supports 61a and 61b at the proper level. The rotor 50 is rotated in the direction of the arrow indicated on Figure 2 of the drawings. The drive mechanism for rotating the rotor comprises a sprocket wheel 67 on the shaft 50a, a chain 68 and a sprocket wheel 69 on a shaft 70 that is journalled in a bearing 71 at the top of the member 59. The shaft 70 extends through a bearing 72 that is mounted on a plate 73 which is provided on the top of the frame member 4. Universal joints 74 and 75 are provided in the shaft 70 between the bearings 71 and 72 to take care of any misalignment in the relative position of the bearings 71 and 72. The shaft 70 carries a gear 76 which meshes with a gear 77 fixed on a shaft 78 that is journalled in a bearing 79 on the plate 73 and a bearing 80 on a bracket 81 that is welded to the cross frame 6. The shaft 78 has a sprocket wheel 82 fixed thereon which is driven by a sprocket chain 83 which overlies the frame member 6 and extends over the frame member 2 to a sprocket wheel 84. The bracket 81 also carries a chain tightening sprocket wheel 83a which can be moved up and down to take up the slack in the chain 83. The sprocket wheel 84 is mounted on a shaft 85 which is driven from the power take off of the towing vehicle. The shaft 85 is supported by bearings 86, 87, 88 and 89 (see Figures 1, 2 and 9). Forwardly of the bearing 89, the shaft 85 is provided with universal joints 90 and 91 to obtain the necessary flexibility in the connection to the towing vehicle. The shaft 85 also furnishes power to drive the elevating conveyor 21 through a sprocket 92 on the shaft 85, a sprocket chain 93 and a sprocket wheel 94 on the drive shaft 95 of the conveyor 21.

The conveyor 21 is of a generally conventional construction. It embodies an endless flexible member 96 supported in a frame 97 and carrying a plurality of upstanding bats 98 which receive the pumpkins as they roll over the barrier 48 and carry the pumpkins up to the top of the conveyor. The conveyor 21 is supported by bars 99 and 100 that project out from the uprights 8 and 11. At its lower end the conveyor 21 is mounted on brackets 101 and 102 that are welded to the frame member 2. The pumpkins are held in the drum 20, until they are lifted over the barrier 48, by the downwardly extending portion 48a of the barrier which extends downwardly from the top of the barrier to substantially the bottom of the shell 31. Guard walls 103 and 104, connected between the uprights 8 and 11 and the conveyor 21, prevent the pumpkins from rolling forwardly or rearwardly with respect to the conveyor until they are picked up by the conveyor bats.

Referring now in particular to Figure 13, this figure illustrates a cross section through the rotor 50 on an enlarged scale. The rotor preferably is made up of two heads 50b and 50c that are triangular in shape and that are fixed to the shaft 50a. The heads 50b and 50c carry wooden panels 50d to provide a triangular shaped rotor that will engage and sweep the pumpkins toward the drum 20.

The crops, such as pumpkins, are inclined to roll readily and for this reason it is essential to protect them against possible crushing by the drum 20. I provide on the frame members 2 and 7 depending guards 105 and 106 which are adapted to prevent the pumpkins and the like from rolling in front of the drum 20 from either side. The guard 105 is shown in Figure 12 and the guard 106 is shown in Figure 11 of the drawings. The guard 106 comprises two depending arms 107 and 108 extending downwardly from the frame member 2. The arms 107 and 108 support a forwardly extending bar 109 which in turn has pivoted thereto two spaced apart links 110 and 111. The links carry a bar 112 which is free to yield rearwardly in case it strikes an obstruction, as it may do, when riding substantially at the ground level. The guard 105 has a rear arm 113 fixed to a bracket 114 on the frame member 7 and a front arm 115 secured to the cross frame member 6. These arms are connected by an angle iron 116. Links 117 and 118 are pivoted to the lower ends of the arms 113 and 115 and carry a forwardly extending bar 119. The links 117 extend beyond the bar 119 and carry a second bar 120 which is also connected to the forward portions 119a of the bar 119 by a link 121.

The details of the hitch mechanism that attach the harvester to the towing vehicle are shown best in Figures 9 and 10. The front ends of the frame members 2 and 4 are provided with a depending bracket 122 to which a tow frame 123 is pivoted by a shaft 124. This tow frame 123 has a clevis 125 at its forward end for attachment to the towing vehicle. The tow frame 123 is made up of a channel shaped member 123a and a bar 123b which diverge rearwardly from the clevis 125 to the ends of the shaft 124. The channel member 123a has two bars 126 and 127 pivoted thereto by a bolt 128. The bars 126 and 127 carry a mounting block 129 at their upper ends for supporting the bearing 89 of the shaft 85. Collars 89a and 89b on the shaft 85 keep the bearing 89 from moving forwardly or rearwardly with respect to the shaft 85. The tow frame 123 is connected to the front end of the frame member 2 by two plates 130 and 131 that are welded to the frame member 2 and extend forwardly therefrom. The two plates are connected to each other by a cross pin 132 in front of the frame member 2 and this cross pins has a screw threaded rod 133 pivoted thereon and extending downwardly into a sleeve 134 that is carried by the tow frame 123. A pivot pin 135 mounts the sleeve 134 and has one end fixed in a depending lug 136 on the bar 123b and the other end is fixed in a lug 137 in the channel member 123a. A nut 138, threaded on the rod 133, provides adjustment whereby the front of the frame members 2 and 4 can be raised and lowered with respect to the tow bar 123 to provide a limited amount of adjustment in the height of the front end of the frame members 2 and 4 with respect to the towing vehicle.

When the harvester is employed to remove pumpkins from a field it is preferred that the pumpkins be first collected in windrows that leave room for the drum 20 and the towing vehicle between rows. As the drum is drawn between the windrows the rotor 50 is positioned to engage the pumpkins in the windrow. The drive means 67—85 for the rotor 50 turn it in a direction to move the lowermost portion thereof forwardly and toward the drum 20 so as to urge the pumpkins to the entrance end of the drum 20 through the ring 30. The rear end of the diagonally extending rotor 50 operates close to the ring 30 so that the pumpkins cannot pass between the rotor and the ring. At the point where the rotor is in juxtaposition to the ring 30 the ring is rising so that the pumpkins cannot roll around the end of the rotor 30 into the drum 20 and out again behind the rotor. The vanes 32 and 46 crowd the pumpkins through the drum 20 as the drum rolls along the ground. If any pumpkins tend to roll across the path of advance of the rotor 30 in front of the drum 20 the guard 106 will stop them. The guard 105 keeps any pumpkins that may escape on the other side of the drum from rolling in front of the drum. Both guards can yield to ride over ground elevations encountered by them.

The vanes serve to connect the rings 28, 29 and 30 to the hub 33 of the drum 20 as well as to lift the crop over the barrier 48. The portion 48a of the barrier 48 provides a smooth surface for the crop to ride upward against as the crop is lifted by the vanes. The rotor 50 is held a short distance above the ground by the frame members 4, 5 and 7. The three wheels 16, 17 and 18 cooperate with the towing vehicle to carry the load of the framework. The drum 20 is free to follow the ground except that it cannot drop below the limits provided by by the stops 37a and 38a on the uprights 8 and 9 for the towing bars 37 and 38 that tow the drum 20. When the rear wheels 16 and 17 are lowered with respect to the framework the stops 37a and 38a can lift the bars 37 and 38 for transporting the drum out of contact with the ground.

Having described my invention, I claim:

1. A harvester for pumpkins and similar crops comprising a framework including rigidly connected horizontal base members having mounted thereon a vertical rectangular structure, wheel means carried by the horizontal base members adapted to support it above the ground, a cylindrical lifting drum located within the framework and extending within the vertical rectangular structure, said lifting drum being adapted to normally roll along the ground surface, the drum being open at both ends and having a peripheral shell and a central hub connected to the shell by means of interposed inclined vanes, said vanes being inclined radially and longitudinally with respect to the drum, each of said vanes extending across the width of the drum, the hub of the drum being rotatably journalled at each end by a support arm pivotably mounted on one of said horizontal base members and adapted to carry the drum along with the framework, means mounted on the vertical rectangular structure adapted to limit downward movement of said support arms, the horizontal base members including a portion extending endwise of the drum from one end of the drum, a rotor having a plurality of smooth planar longitudinal outer surfaces, said rotor being rotatably carried by said last-named portion of the horizontal base members, said rotor extending from said one end of the drum diagonally and forwardly across the last named portion and being located at a slight elevation above the ground surface, drive means operatively connected to said rotor adapted to rotate it, and conveyor means mounted on said vertical rectangular structure and extending outwardly from the remaining end of said drum.

2. The invention defined in claim 1 further comprising guard means suspended from the horizontal base members and extending forwardly along the side edges of said drum.

3. The invention defined in claim 1 including means operatively connected between said framework and said wheel means adapted to raise the framework with respect to said wheel means.

References Cited in the file of this patent
UNITED STATES PATENTS

| | | |
|---|---|---|
| 1,221,974 | Crowson | Apr. 10, 1917 |
| 2,755,612 | Johnson | July 24, 1956 |
| 2,760,322 | Johnson | Aug. 28, 1956 |